(12) United States Patent
Breedt et al.

(10) Patent No.: US 6,887,323 B1
(45) Date of Patent: May 3, 2005

(54) METHOD OF REDUCING DENSITY BY MEANS OF GAS GENERATING AGENT

(75) Inventors: Jacobus Breedt, Sasolburg (ZA); Hugh Albert Sandry Stephens, Deneysville (ZA); William Luciano Spiteri, Pretoria (ZA); Edwin Bals, Sasolburg (ZA)

(73) Assignee: Sasol Chemistry Industries Limited, Johannesburg (ZA)

( * ) Notice: Subject to any disclaimer, the term of this patent is extended or adjusted under 35 U.S.C. 154(b) by 161 days.

(21) Appl. No.: 10/129,738

(22) PCT Filed: Nov. 7, 2000

(86) PCT No.: PCT/ZA00/00209

§ 371 (c)(1),
(2), (4) Date: May 10, 2002

(87) PCT Pub. No.: WO01/36330

PCT Pub. Date: May 25, 2001

(30) Foreign Application Priority Data

Nov. 17, 1999 (ZA) .............................................. 99/7161

(51) Int. Cl.[7] ........................ C06B 45/00; C06B 31/28; D03D 23/00; C01C 1/18
(52) U.S. Cl. .......................... 149/2; 149/46; 149/109.6; 423/396
(58) Field of Search .......................... 149/2, 46, 109.6; 264/3.1; 423/396

(56) References Cited

U.S. PATENT DOCUMENTS

| | | | | |
|---|---|---|---|---|
| 4,997,494 A | * | 3/1991 | Nguyen | 149/2 |
| 5,540,793 A | | 7/1996 | Bals et al. | 149/2 |
| 5,936,194 A | * | 8/1999 | Marlow et al. | 149/2 |

FOREIGN PATENT DOCUMENTS

| | | |
|---|---|---|
| EP | 0 514 037 A1 | 11/1992 |
| EP | 0 831 079 A1 | 3/1998 |
| RU | 767025 | 9/1980 |

* cited by examiner

*Primary Examiner*—Aileen B. Felton
(74) *Attorney, Agent, or Firm*—Finnegan, Henderson, Farabow, Garrett & Dunner, L.L.P.

(57) ABSTRACT

This invention relates to a method of reducing density in an ammonium nitrate product. The method comprises providing a gas generating agent in the form of a water-insoluble solid compound capable of generating gas by chemical reaction and providing an ammonium nitrate product. The water-insoluble solid gas generating agent is introduction into the ammonium nitrate product under conditions causing gas generation by the gas generating agent in the ammonium nitrate product. The ammonium nitrate product is particulated to form a particulated prilled ammonium nitrate product with reduced density. The invention also relates to a particulated ammonium nitrate product produced by this method and to the use of a gas generating agent in the form of a water-insoluble solid compound reduce density in a particulate ammonium nitrate product.

21 Claims, No Drawings

METHOD OF REDUCING DENSITY BY MEANS OF GAS GENERATING AGENT

TECHNICAL FIELD

This invention relates to a method of reducing density in a particulated ammonium nitrate product such as prilled or granulated ammonium nitrate, and to products formed by the method.

BACKGROUND ART

Particulated ammonium nitrate in the form of prilled ammonium nitrate, and particularly porous prilled ammonium nitrate (PPAN) is widely used, for example in the manufacture of explosive compositions. PPAN is usually formed by prilling an aqueous ammonium nitrate solution and thereafter drying the prills. During the drying process, the water in the prills evaporates, creating the porosity in the prills to reduce density and to allow absorption of fuels during the preparation of explosives. The process of drying the prills is expensive and the drying apparatus used is also capital intensive.

In U.S. Pat. No. 5,540,793 encapsulated microspheres were introduced in the prilled product to control the density and to render the fuelled prills more sensitive. The patent also teaches that the porous prilled product so formed may include limestone in fairly large amount from 30.0% to 0.01% mass per mass final product. Some of the inventors of U.S. Pat. No. 5,540,793 and the present invention are the same and it is known to the present inventors that the limestone mentioned in U.S. Pat. No. 5,540,793 had a fairly large particle diameter of between 200 $\mu$m and 500 $\mu$m and that it was used to desensitize the product.

When limestone is added in this manner, no gas generation takes place during the formation of the prills, mainly due to the large particle size of the limestone but also due to factors such as acidity of the ammonium nitrate and the timing of the addition of the limestone.

U.S. Pat. No. 5,540,793 also teaches that the porosity of the porous prilled product which includes the encapsulated microspheres can further be enhanced by the inclusion of gas in the product during the prilling process. It is taught that this gas can be developed in situ in the products via a suitable chemical reaction. The gas may comprise carbon dioxide which is formed through decomposition of a suitable carbonate in acid medium. The patent further teaches that the carbonate may comprise any suitable water-soluble inorganic salt of carbonic acid, for example potassium and/or sodium carbonate or alternatively, it may comprise a less soluble salt.

However, it was found that it is very difficult to control the rate of the gas release and bubble size when gas is developed in situ in this manner. When the gas generation is too much the progressively formed crust, resulting from the solidification of the ammonium nitrate on the surface of the particle, will be too weak and the generated gas will destroy the crust, resulting in excessive breakage of the particles. When gas generation is too low or too slow, the required low density and increased porosity will not be developed.

It is believed the general trend is that the smaller the pores (down to about 30 $\mu$m) in PPAN the higher will be the detonation velocity, detonation pressure, and thus the brisance of an explosive composition containing such PPAN.

DISCLOSURE OF THE INVENTION

Surprisingly it has now been found that when a water-insoluble compound (capable of generating gas in a chemical reaction) is used and the conditions are suitable, for example by ensuring that the particle size of the compound is below a certain size, controlled gas release can be obtained in the formation of particulated ammonium nitrate to obtain a product of reduced density and a suitable pore size.

In this specification the term "water-insoluble compound" is used to mean a compound which dissolves in water at less than 1 g/100 g of water at room temperature.

According to the present invention a method of reducing density in an ammonium nitrate product comprises:

providing a gas generating agent in the form of a water-insoluble solid compound capable of generating gas by chemical reaction;

providing an ammonium nitrate product;

introducing the water-insoluble solid gas generating agent into the ammonium nitrate under conditions causing gas generation by the gas generating agent in the ammonium nitrate product; and particulating the ammonium nitrate product to form a particulated ammonium nitrate product with reduced density.

The particle density and the bulk density of the particulated ammonium nitrate is reduced due to the formation of closed voids (also referred to as closed pores) within the particulated product. Some pores or voids may open to the outside of the particulated product; such open pores will also reduce the density and will have the added advantage of increasing the porosity of the particulated product porosity of particulated ammonium nitrate is important for the absorption of fuel oil in the manufacture of ANFO.)

It was found that when a water-insoluble solid gas generating agent is used, it is much easier to control the rate and amount of gas generated during the formation of the particulated product and to ensure that gas bubbles are formed with a suitable size to form pores of a suitable size. Pores of a suitable size are preferably pores with a diameter smaller than 150 $\mu$m, preferably smaller than 70 $\mu$m, preferably about 30 $\mu$m.

It will be appreciated that factors such as the type of gas generating agent added; amount of gas generating agent added; particle size of the gas generating agent added; pH of the reaction mixture of the gas generating agent and ammonium nitrate product; pH of the ammonium nitrate product; type and concentration of an acid provided to react with the gas generating agent (where the gas generating agent is of the type which reacts with an acid to generate gas); type and concentration of base provided in ammonium nitrate; the temperature at which the gas generation reaction takes place; timing of addition of the gas generating agent; the concentration of the ammonium nitrate, all play a role in the rate of gas generation, bubble size of the generated gas and timing when the gas is generated. In use these factors can be controlled in order that the gas is generated during particulation of the product, that the gas is generated at a suitable rate and has a suitable bubble size to form pores of a suitable size. Accordingly factors that influence the rate of gas generation, bubble size of generated gas and timing when gas is generated can be controlled to obtain the desired effect.

The gas generating agent may comprise a water-insoluble carbonate compound, preferably a carbonate salt. Preferably it comprises a metal carbonate, preferably an alkaline earth metal carbonate. Preferably it comprises at least one compound selected from the group consisting of calcium carbonate and magnesium carbonate. Most preferably it comprises calcium carbonate.

The gas generating agent may comprise a compound capable of generating gas, preferably carbon dioxide ($CO_2$), by chemical reaction with a suitable acid. Calcuim carbonate is such a gas generating agent. Preferably the acid is an acid present in the ammonium nitrate product.

The average particle diameter of the water-insoluble gas generating agent is preferably below 100 μm. More preferably it is below 40 μm, preferably below 2 μm, preferably below 1 μm and preferably below 0.5 μm. In a preferred embodiment the average particle diameter is about 0.33 μm. In a preferred embodiment of the invention the gas generating agent comprises precipitated calcium carbonate preferably with an average particle diameter of about 0.33 μm. It has been found that the conditions for in situ formation of the gas can particularly be controlled by providing the gas generating agent with a particle diameter as set out above. The particle diameter ranges described above of below 40 μm are especially (but not limited thereto) suitable for calcium carbonate.

The gas generating agent is preferably provided in the form of an aqueous suspension. Preferably the suspension comprises between 1% and 70% mass gas generating agent/total mass suspension, preferably about 30% mass gas generating agent/total mass suspension, especially in the case of calcium carbonate.

In the preferred embodiment of the invention where the gas generating agent comprises precipitated calcium carbonate with an average particle diameter of about 0.33 μm, the calcium carbonate is added to the ammonium nitrate product at a concentration of 0.001% to 2% mass calcium carbonate/mass ammonium nitrate product. Preferably the calcium carbonate is added at a concentration of 0.01% to 0.06% mass calcium carbonate/mass ammonium nitrate, and preferably of a concentration of about 0.03% mass calcium carbonate/mass ammonium nitrate.

The ammonium nitrate product to be particulated may comprise a melt of ammonium nitrate.

Alternatively, the ammonium nitrate product to be particulated may comprise an aqueous solution of ammonium nitrate. The aqueous solution of ammonium nitrate may comprise above 90%, preferably above 96% mass ammonium nitrate/total mass aqueous ammonium nitrate solution. To prevent ammonium nitrate solutions at such high concentration from solidifying and to facilitate particulation, the temperature of the solution has to be raised. For example, in the case of 97% mass ammonium nitrate/mass aqueous ammonium nitrate solution a temperature of about 158° C. is required to prevent solidification and to facilitate particulation. In the case of 99% mass ammonium nitrate/mass aqueous ammonium nitrate solution a temperature of about 170° C. is required to prevent solidification and to facilitate particulation.

Preferably the ammonium nitrate product is acidic, preferably with a pH between 2 and 5, preferably about 4. This is especially the case where the gas generating agent is of the type which generates gas by reaction with a suitable acid. However, it is foreseen that in other embodiments the solution may be alkaline. For example it is believed that a gas generating agent such as $CaCO_3$ will release $NH_3$ from ammonium nitrate, especially from ammonium nitrate with a high alkalinity. Alternatively the ammonia could be generated by adding gas generating agents such as calcium oxide to the ammonium nitrate.

The gas generating agent may be introduced into the ammonium nitrate product prior to particulation of the ammonium nitrate product. Alternatively it may be introduced during particulation of the ammonium nitrate.

The ammonium nitrate product may be particulated by means of prilling. Alternatively it may be granulated, for example by using a pan granulator.

It is believed that the gas generating agent will be useful in more concentrated solutions where less water is available to evaporate and consequently to create porosity.

Hollow microspheres (also known as microballoons) may also be used in combination with the gas generating agent. The hollow microspheres may be used to increase the detonation efficiency, sensitivity and velocity of detonation of fuelled prills. Any type of hollow microsphere may be used but preferably hollow microspheres are used which do not contain a composition which may decompose at high temperatures to form an acid. One such composition is polyvinylidene chloride (PVDC) which decomposes at high temperatures to form hydrochloric acid. An increase in the amount of acid in the product to be particulated will increase the rate of gas generation in cases where the gas generating agent is of the type which generates gas upon reaction with an acid. Furthermore, an increase in the amount of acid present in ammonium nitrate causes the decomposition temperature of the ammonium nitrate to be lowered. At a low pH the decomposition temperature of ammonium nitrate is lowered to such an extent that it becomes unstable which may result in deflagration or detonation.

Low density chlorine-free hollow microspheres, that are available in certain grades of Expancel (supplied by Akzo Nobel of Sweden), are preferred hollow microspheres to be used in this invention.

The invention also relates to the use of a gas generating agent in the form of a water-insoluble solid compound capable of generating gas by chemical reaction wherein the average particle diameter of the gas generating agent is below 100 μm in diameter, in the preparation of a particulated ammonium nitrate product to form a particulated ammonium nitrate product with reduced density.

The invention also relates to a particulated ammonium nitrate product with reduced density prepared according to the method substantially as described herein above. The particulated ammonium nitrate may comprise porous product such as PPAN (porous prilled ammonium nitrate) or porous granulated ammonium nitrate.

The invention also relates to a blasting composition including particulated ammonium nitrate substantially as described hereinabove. The blasting composition may comprise ANFO or heavy ANFO.

The invention will now be further described by means of the following non-limiting examples.

EXAMPLE 1

A three hour test run in a conventional prilling plant where PPAN is produced from an ammonium nitrate (AN) solution was conducted by introducing a gas generating agent into the AN to be prilled.

The prilling plant is a conventional one and is accordingly not described in detail in this specification. Some more detail of the apparatus used is described in U.S. Pat. No. 5,540,793. Amongst others the apparatus comprises a prilling nozzle for forming prills.

Gas generating agent in the form of precipitated calcium carbonate ($CaCO_3$) with a particle diameter of about 0.33 μm was made up as an aqueous suspension comprising 30% mass $CaCO_3$/mass aqueous suspension. It has been found that if large particles of $CaCO_3$ are used in an AN solution, the pH of the AN solution has to be lowered to provide an adequate rate of gas generation. If the pH of AN is lowered too much, rendering it less stable, the decomposition of AN increases.

The AN to be prilled comprised an aqueous AN solution comprising 97% mass AN/mass AN solution. The solution was provided at a temperature of 158° C. The pH of an AN solution was lowered from the normal pH of 5.8 to a pH of 3.8 during the test run to increase the rate of gassing. The pH of the AN solution was adjusted by reducing the addition of ammonia after the concentration step.

The calcium carbonate suspension was added in order that the AN solution contained about 0.03% mass calcium carbonate/mass total AN solution. The calcium carbonate was added in order that it was retained in the AN solution for a period of about 2 seconds before the formation of the ammonium nitrate into droplets which formed into the prills.

Table 1 shows the results of the tests on the PPAN produced compared to PPAN produced under similar conditions but without the addition of $CaCO_3$.

In Table 1 the percentage of CaCO3 is expressed as percentage mass $CaCO_3$/mass of PPAN solution. The volume of closed pores or voids was calculated from the apparent and true particle densities. The pore volume was determined with a mercury porosity meter, which determines pore value as a function of the mercury pressure and consequently of the pore size. The apparent particle density is determined by measuring the volume change when 50 grams of prills are carefully added to 50 ml diesel in a 100 ml measuring cylinder. A stopper is placed on the measuring cylinder and the cylinder is shaken and tapped to allow the diesel to penetrate most of the open pores. The effectively closed pores can then be calculated from the apparent particle density and the true particle density. The formula is: closed pores=(1/apparent particle density)−1/1.724 (the true particle density of ammonium nitrate at room temperature is 1 1.724 g/cc). The oil absorption capacity is expressed as percentage mass oil/mass prills.

The fuelled prills were formed by adding diesel in an amount of 6% mass diesel/mass ANFO.

TABLE 1

Test Results

| | PPAN with $CaCO_3$ | Normal PPAN without $CaCO_3$ |
|---|---|---|
| Calcium (as $CaCO_3$) | 0.03 | 0 |
| Loose bulk density (kg/l) | 0.67 | 0.74 |
| Apparent particle density (g/ml) | 1.41 | 1.50 |
| Closed pores (ml/g) | 0.13 | 0.08 |
| Pore volume (20 to 70 μm; ml/g) | 0.057 | 0.013 |
| Oil absorption capacity (%) | 10 | 10 |
| Sensitivity of fuelled prills (6% m/m diesel in ANFO. Lead compression in mm) | 49 | 1 |

From Table 1 it can be seen that gassing with $CO_2$ formed in situ from $CaCO_3$ reacting with nitric acid in the AN solution resulted in:

a) A significant increase in the volume of closed pores and consequently a decrease in the loose bulk density; and
b) A more sensitive fuelled prill (ANFO), as indicated by the lead compression test. The increased sensitivity was probably caused by an increase in the volume of small (20 to 70 μm) closed pores. These pores must be closed or the opening so small that diesel is not absorbed.

EXAMPLE 2

A pan granulator was used to form AN granules with a reduced density by introducing a gas generating agent into the AN.

The AN to be particularized comprised 99.5% AN and 0.5% water. The AN was provided in the form of a melt at about 170° C. and the pH of the AN was 3.8.

The gas generated agent was again in the form of precipitated $CaCO_3$ with a particle diameter of about 0.33 μm.

A pan granulator and seed material (in the form of particulated ammonium nitrate of a suitable size) were used to form the AN melt into granules. In test 1, the seed material was introduced into the pan granulator and was sprayed with the AN melt which formed into granules. In test 2 the seed material was mixed with the $CaCO_3$. This mixture was introduced into the pan granulator and sprayed with the AN melt. The granulated AN which formed contained about 0.1% (mass/mass) $CaCO_3$. In test 3 the $CaCO_3$ was made up as an aqueous suspension containing 20% mass $CaCO_3$/mass aqueous suspension. The $CaCO_3$ was injected into the AN melt which mixture was then sprayed onto the seed material in the pan granulator to form granules. The AN melt sprayed onto the seed material contained about 0.1% mass $CaCO_3$/mass total AN melt. The $CaCO_3$ was added in order that it was retained in the AN melt for a period of about 2 seconds before being sprayed onto the seed material.

Table 2 shows the results of the granulated AN formed by the different tests. Percentages are expressed as mass per mass.

TABLE 2

TEST RESULTS

| | Test 1 | Test 2 | Test 3 |
|---|---|---|---|
| Moisture % | 0.17 | 0.16 | 0.20 |
| Oil absorption capacity % | 7 | 8 | 10 |
| Loose bulk density (kg/l) | 0.66 | 0.62 | 0.62 |

From table 2 it is clear that the use of the gas generating agent provided a product with increased oil absorption capacity and a reduced bulk density.

By using a gas generating agent such as precipitated $CaCO_3$ more concentrated An solution can be used to prepare explosive grade ammonium nitrate than used in the normal prilling process. This allows for the production of porous AN or AN with reduced density by use of a pan granulator, blunger, drum granulator or other granulation methods.

It will be appreciated that many variations in detail are possible without thereby departing from the scope and spirit of the invention.

What is claimed is:

1. A method of reducing density in an ammonium nitrate product comprising:
   providing a gas generating agent in the form of a water-insoluble solid compound capable of generating gas by chemical reaction with a suitable acid and wherein the average particle diameter of the gas generating agent is below 40 μm;
   providing an ammonium nitrate product which is acidic with a pH between 2 and 5;
   introducing the water-insoluble solid gas generating agent into the ammonium nitrate product under conditions causing gas generation by the gas generating agent in the ammonium nitrate product; and
   particulating the resulting ammonium nitrate product to form a particulated ammonium nitrate product with reduced density.

2. The method of claim 1 wherein the conditions causing gas generation in the ammonium nitrate product are controlled to regulate the rate of gas generation and bubble size of the generated gas.

3. The method of claim 2 wherein the conditions are controlled by controlling at least one of the conditions selected from the group consisting of the type of gas generating agent added; amount of gas generating agent added; particle diameter of the gas generating agent added; pH of the reaction mixture of the gas generating agent and ammonium nitrate product; pH of the ammonium nitrate product; type of acid provided in the ammonium nitrate product; concentration of acid provided in the ammonium nitrate product; type of base provided in the ammonium nitrate product; concentration of base provided in the ammonium nitrate product; the temperature at which the gas generation reaction takes place; and the concentration of the ammonium nitrate product.

4. The method of claim 1 wherein the gas generating agent comprises a water-insoluble carbonate compound.

5. The method of claim 4 wherein the carbonate compound comprises an alkaline earth metal carbonate.

6. The method of claim 5 wherein the carbonate compound comprises calcium carbonate.

7. The method of claim 4 wherein the carbonate compound is a compound capable of generating carbon dioxide by chemical reaction with a suitable acid.

8. The method of claim 1 wherein the average particle diameter of the water-insoluble gas generating agent is below 2 $\mu$m.

9. The method of claim 8 wherein the average particle diameter of the water-insoluble gas generating agent is below 0.5 $\mu$m.

10. The method of claim 1 wherein the water-insoluble gas generating agent is calcium carbonate with an average particle diameter of about 0.33 $\mu$m.

11. The method of claim 10 wherein the calcium carbonate is precipitated calcium carbonate.

12. The method of claim 11 wherein the calcium carbonate is provided in the form of an aqueous suspension.

13. The method of claim 11 wherein the calcium carbonate is added to the ammonium nitrate product at a concentration of 0.001% to 2% mass calcium carbonate/mass ammonium nitrate product.

14. The method of claim 1 wherein the ammonium nitrate product comprises a melt of ammonium nitrate.

15. The method of claim 1 wherein the ammonium nitrate product comprises an aqueous solution of ammonium nitrate.

16. The method of claim 1 wherein the ammonium nitrate product is acidic with a pH between 2 and 5.

17. The method of claim 1 wherein hollow microspheres are also introduced into the resulting ammonium nitrate product.

18. The method of claim 1 wherein the resulting ammonium nitrate product is particulated by means of prilling.

19. The method of claim 1 wherein the resulting ammonium nitrate product is particulated by means of granulation.

20. The particulated ammonium nitrate product produced by the method of claim 1.

21. A blasting composition including a particulated ammonium nitrate product of claim 20.

* * * * *

UNITED STATES PATENT AND TRADEMARK OFFICE
CERTIFICATE OF CORRECTION

PATENT NO. : 6,887,323 B1
DATED : May 3, 2005
INVENTOR(S) : Jacobus Breedt et al.

It is certified that error appears in the above-identified patent and that said Letters Patent is hereby corrected as shown below:

<u>Title page,</u>
Item [57], ABSTRACT,
Line 5, after "reaction", insert a comma;
Line 6, "introduction" should read -- introduced --;
Line 14, after "compound" and before "reduce", insert -- to --; and
Line 15, "particulate" should read -- particulated --.

<u>Column 8,</u>
Lines 17 and 18, delete claim 16.

Signed and Sealed this

Sixth Day of September, 2005

JON W. DUDAS
*Director of the United States Patent and Trademark Office*